United States Patent
Stone

(10) Patent No.: US 10,378,959 B1
(45) Date of Patent: Aug. 13, 2019

(54) OPTICAL ANGULAR MEASUREMENT SENSORS

(71) Applicant: Wavefront Research, Inc., Northampton, PA (US)

(72) Inventor: Thomas W. Stone, Hellertown, PA (US)

(73) Assignee: Wavefront Research, Inc., Northampton, PA (US)

( * ) Notice: Subject to any disclaimer, the term of this patent is extended or adjusted under 35 U.S.C. 154(b) by 0 days.

(21) Appl. No.: 16/025,185

(22) Filed: Jul. 2, 2018

Related U.S. Application Data

(63) Continuation of application No. 15/632,767, filed on Jun. 26, 2017, now Pat. No. 10,012,547, which is a continuation of application No. 15/155,939, filed on May 16, 2016, now Pat. No. 9,689,747, which is a continuation of application No. 14/216,459, filed on Mar. 17, 2014, now Pat. No. 9,341,517.

(60) Provisional application No. 61/799,699, filed on Mar. 15, 2013.

(51) Int. Cl.
| | |
|---|---|
| *G01J 5/10* | (2006.01) |
| *G01J 5/08* | (2006.01) |
| *G01J 1/04* | (2006.01) |
| *G01J 1/42* | (2006.01) |
| *B64G 3/00* | (2006.01) |
| *G02B 23/00* | (2006.01) |
| *G01S 1/70* | (2006.01) |
| *G01S 3/786* | (2006.01) |
| *G02B 5/20* | (2006.01) |
| *G01S 3/78* | (2006.01) |

(52) U.S. Cl.
CPC .............. *G01J 5/10* (2013.01); *B64G 3/00* (2013.01); *G01J 1/0488* (2013.01); *G01J 1/4228* (2013.01); *G01J 5/0862* (2013.01); *G01S 1/70* (2013.01); *G01S 3/7867* (2013.01); *G02B 5/208* (2013.01); *G02B 23/00* (2013.01); *G01S 3/78* (2013.01)

(58) Field of Classification Search
CPC ........ B64G 3/00; G01J 1/0488; G01J 1/4228; G01J 5/0862; G01J 5/10; G01S 1/70; G01S 3/78; G01S 3/7867; G02B 5/208; G02B 23/00
See application file for complete search history.

(56) References Cited

U.S. PATENT DOCUMENTS

| | | |
|---|---|---|
| 3,048,352 A | 8/1962 | Siegfried |
| 6,285,318 B1 | 9/2001 | Schoen |
| 7,349,803 B2 | 3/2008 | Belenkii et al. |
| 7,349,804 B2 | 3/2008 | Belenkii et al. |
| 7,447,591 B2 | 11/2008 | Belenkii et al. |
| 8,355,868 B2 | 1/2013 | Brace |
| 8,471,906 B2 | 6/2013 | Belenkii et al. |
| 8,597,025 B2 | 12/2013 | Belenkii et al. |
| 8,620,582 B2 | 12/2013 | Dods et al. |
| 2004/0135989 A1 | 7/2004 | Klebe |
| 2006/0232839 A1 | 10/2006 | Moser et al. |
| 2007/0117078 A1 | 5/2007 | Bruns et al. |

(Continued)

FOREIGN PATENT DOCUMENTS

CN 104567868 A 4/2015

*Primary Examiner* — Mark R Gaworecki
(74) *Attorney, Agent, or Firm* — Burns & Levinson LLP; Orlando Lopez

(57) ABSTRACT

Systems that enable observing celestial bodies during daylight or in under cloudy conditions.

12 Claims, 22 Drawing Sheets

(56) References Cited

U.S. PATENT DOCUMENTS

| | | |
|---|---|---|
| 2008/0017784 A1 | 1/2008 | Hoot |
| 2009/0324015 A1 | 12/2009 | Way |
| 2012/0173143 A1* | 7/2012 | Belenkii ................ G01C 21/02 701/513 |
| 2013/0222603 A1 | 8/2013 | Agranov et al. |
| 2015/0042793 A1 | 2/2015 | Belenkii et al. |

* cited by examiner

| Aperture | 20 mm | 15 mm | 10 mm | 5 mm | 2.5 mm |
|---|---|---|---|---|---|
| SNR | 509 | 472 | 373 | 302 | 192 |

FIG. 14

OPTICAL ANGULAR MEASUREMENT SENSORS

CROSS-REFERENCE TO RELATED APPLICATIONS

This application is a continuation of co-pending U.S. application Ser. No. 15/632,767, filed Jun. 26, 2017 which is a continuation of U.S. application Ser. No. 15/155,939, filed May 16, 2016, entitled OPTICAL ANGULAR MEASUREMENT SENSORS, now U.S. Pat. No. 9,689,747, which in turn is a continuation of U.S. application Ser. No. 14/216,459, filed Mar. 17, 2014, now U.S. Pat. No. 9,341,517, which in turn claims priority to and benefit of U.S. Provisional Application No. 61/799,699, filed Mar. 15, 2013, the entire contents of which are incorporated herein by reference for all purposes.

STATEMENT OF FEDERALLY SPONSORED RESEARCH OR DEVELOPMENT

This invention was made partially with U.S. Government support from the U.S. Marine Corps under Contract No. M67854-09-C-6511. The U.S. Government has certain rights in the invention.

BACKGROUND

These teachings relate generally devices for observing celestial bodies during daylight or nighttime.

There is a need for systems that enable observing celestial bodies during daylight or under cloudy conditions.

SUMMARY

The various embodiments of the present teachings disclose systems that enable observing celestial bodies during daylight or in under cloudy conditions.

For a better understanding of the present invention, together with other and further objects thereof, reference is made to the accompanying drawings and detailed description.

BRIEF DESCRIPTION OF THE DRAWINGS

FIG. 14 shows Experimentally Measured SNRs for Daytime Star Images obtained using the system of these teachings;

DETAILED DESCRIPTION

Figure 1:
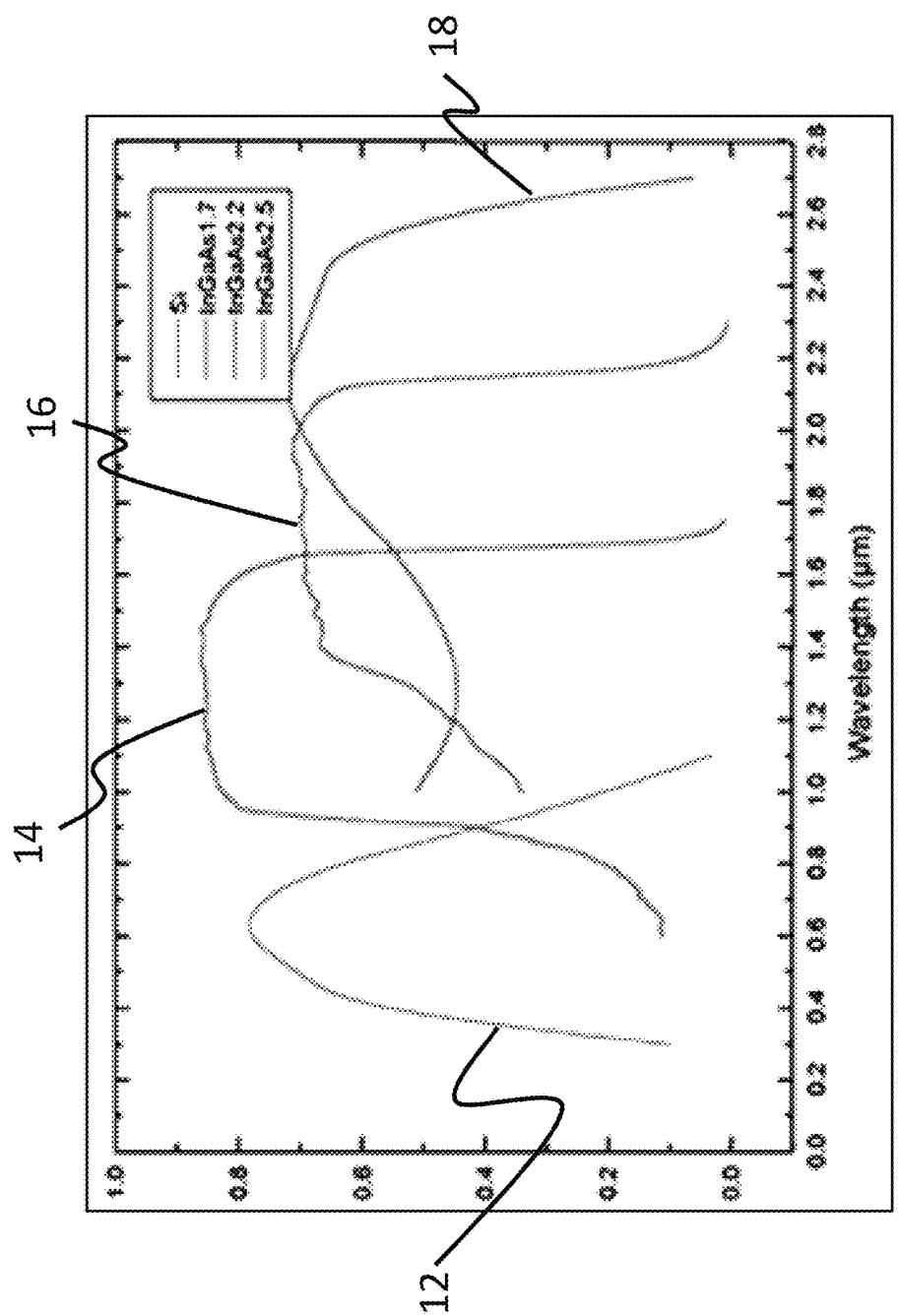
FIG. 1 shows the Spectral Sensitivities of Focal Plane Arrays Made From Silicon and Three Forms of InGaAs.

This invention relates in part to devices for observing celestial bodies during daylight or nighttime. This function allows a measure of angles, such as azimuth, from identifying the positions of these stars or bodies. One term for labeling many of the embodiments of these inventions is Optical Azimuth Sensor, or OAS.

In order to understand the expected operation of the optical azimuth sensor during bright sunlight conditions it is necessary to consider the optics of the sky. In planets (or the moon) without an atmosphere, the sky is black both at nighttime and during daylight. On such a planet, conventional celestial navigation and the optical azimuth sensor would clearly function well both at night and during the day. On Earth however, the atmosphere scatters sunlight, and as a result during daytime the sky is bright and blue. Other than in clouds (where the scatterers are relatively large droplets of water), many of the scatterers in the atmosphere are very small compared to the wavelength of light and the resulting scatter is described very accurately as a Raleigh Scattering phenomenon. In Raleigh scattering, the amount of light scattered increases very rapidly as the wavelength of the incident light decreases, i.e., blue light is scattered much more strongly than red light. This is why the sky appears blue.

Quantitatively, in the Raleigh Scattering regime light is scattered in proportion to the inverse of the fourth power of the wavelength. Visible light covers a spectral band from 0.4 $\mu$m (blue) to 0.7 $\mu$m (red). Red light at that wavelength is scattered by a factor of 9.37 or nearly 10 times less than blue light of that wavelength. In other words, if an instrument were to look at the sky through a blue filter that passed 0.4 $\mu$m wavelength light, and then through a red filter that passed 0.7 $\mu$m wavelength light, the sky would look roughly 10 times brighter through the blue filter than through the red filter.

Standard silicon CCD's or silicon focal plane arrays are sensitive to wavelengths out to about 1 $\mu$m. This is illustrated by spectral sensitivity curve 12 in FIG. 1. Light with wavelengths of 1 $\mu$m is scattered 40 times less than blue light.

Standard InGaAs focal plane arrays are sensitive to wavelengths up to 1.7 μm, illustrated in spectral sensitivity curve 14 of FIG. 1, which are scattered 326 times less than blue light. Modified InGaAs focal plane arrays are sensitive to wavelengths out to 2.5 μm, shown by spectral sensitivity curves 16 and 18 of FIG. 1, and these wavelengths are scattered roughly more than 1525 times less than blue light.

Thus by imaging the sky using a focal plane array through a filter in the infrared at a band of wavelengths near 1.7 μm, the sky will be roughly 326 times darker than imaging the sky in the visible using blue light. In a more extreme example, long wave infrared (LWIR) light near 14 μm may be scattered roughly a million times less strongly than blue light.

Figure 2:
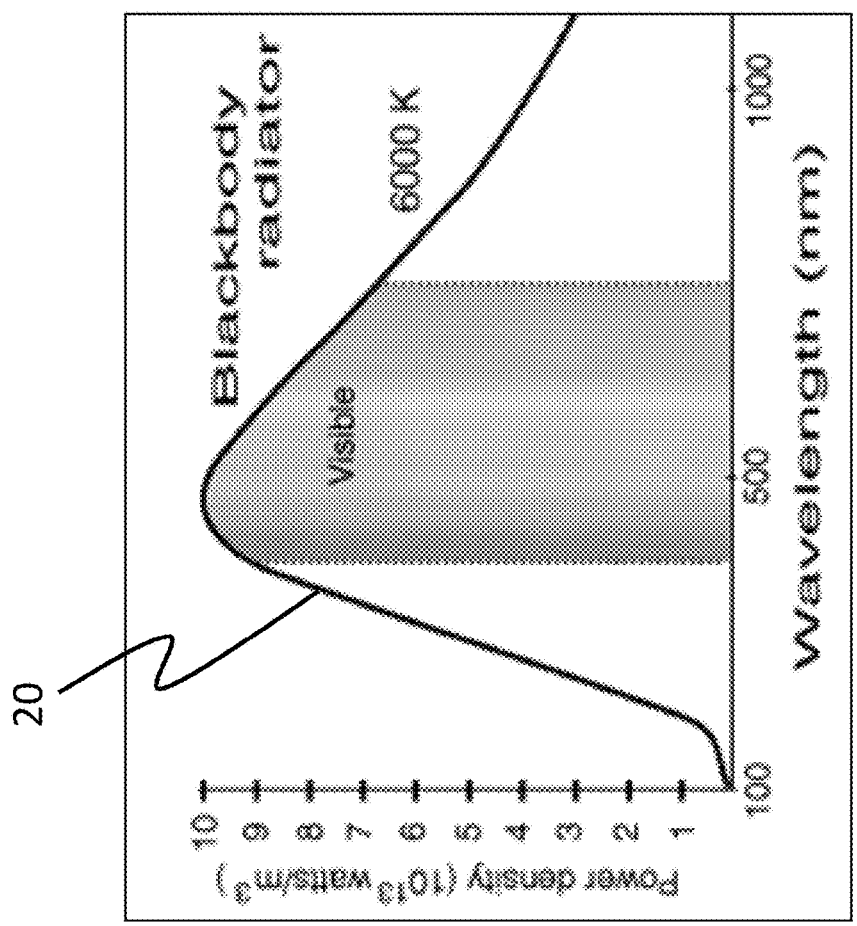
FIG. 2 shows Relative Power Density as a Function of Wavelength for a Sun Temperature Black Body outside the Atmosphere.

The light from stars, however, is imaged directly through the atmosphere (sky) and so the star light is essentially just as bright at a given wavelength as it is at nighttime. [The spectral dependency of the starlight as a function of wavelength roughly follows a black body curve such as curve 20 in FIG. 2 for a 6000 degree Kelvin black body representing roughly a 6000 degree Kelvin star, and so there is a small roll-off in intensity in the infrared (e.g., a decrease of roughly a factor of 2 from the peak irradiance at 0.5 μm to the irradiance at 1.0 μm), but this is very small in comparison with the decrease in sky brightness in the infrared].

Further understanding of the embodiments and expected OAS daylight operation comes from comparing the sky brightness in daytime and nighttime. One can see the bright reference stars as the morning sky brightens until nearly sunrise. At sunrise on a clear day, the ambient illuminance is roughly 40 lux. The illuminance from a clear blue sky at midday is roughly 20,000 lux. In other words, for an observer the illuminance of this sky is roughly 500 times brighter at midday than at sunrise. Therefore if the OAS images the stars under a bright daylight sky at a wavelength band centered at 1.7 μm, the starlight will be weaker by roughly a factor near 3 (due to blackbody roll-off), but the sky will be darker by a factor of 325. If an observer's eye was sensitive to the 1.7 micron infrared wavelength, the stars may be plainly visible against a fairly dark sky.

The situation is even better, though, since using a focal plane array in the OAS the point images of the stars can be more readily identified from a significant background by subtracting the uniform background, and so the OAS operate effectively using simple silicon CCDs at a wavelength near 1 μm or even shorter. The visibility of the weaker stars is limited in large part by the background noise (e.g., shot noise) compared to the signal of the faint star.

Anticipated Benefits of the Technical Innovations

There are many significant advantages that arise from the OAS technical innovation proposed here, including:

1. Compact Size. The OAS includes imager, focal plane, and FPGA or microprocessor in single miniaturized package (e.g., in one embodiment targeted toward roughly 1 cubic inch).

2. Low Mass. The tiny sensor is expected to weigh only tens of grams.

3. High Accuracy. A 4-megapixel CCD array should provide an accuracy of roughly 0.06° resolution. Higher and lower angular resolutions are possible.

4. Minimal Setup Time. The OAS is simply exposed to the sky and digital data should be available after a short processing time (e.g., a fraction of a second to seconds).

5. Rugged. The OAS is rugged and durable and no focusing is required.

6. Low Power Consumption. The simple electronics are expected to dissipate very little power.

7. Insensitive to Magnetic Interference. The OAS senses azimuth angle optically and is insensitive to magnetic interference.

8. Insensitive to Electronic Jamming. The OAS senses azimuth angle optically and is insensitive to electronic jamming. The OAS internal electronics are easily shielded.

9. Not Dependent on Earth's Magnetic Field. Macroscopic shifts in the Earth's magnetic field, as well as local perturbations in the Earth's magnetic field have no effect on the OAS.

10. Not Dependent on GPS Signals. The OAS senses azimuth angle optically and is not dependent on GPS signals.

11. High Precision Digital Output. The OAS is designed to output digital azimuth angle in standard formats.

12. Not Dependent on Triangulation. Triangulation setup is not required for OAS operation.

13. Referenced to True North. The OAS is readily configured to reference to True North.

14. Reduced Sensitivity to Smoke and Haze. The Infrared wavelengths used have reduced sensitivity to smoke and haze.

15. Readily Integrated in Man-Portable Targeting Equipment. The tiny OAS sensor is readily mechanically interfaced to man-portable targeting equipment. The OAS FPGA or microprocessor flexibly outputs data in formats compatible with targeting equipment.

16. Potentially Useful In Battlefield Environments. The OAS can be based on infrared wavelengths that have reduced sensitivity to battlefield smoke and haze. The external window protecting the infrared imager is insensitive to dirt and scratches and is readily cleanable.

17. Insensitive to Moderate Cloud Cover. Moderate cloud cover, even with thick clouds can in some cases be tolerated during OAS operation since reference stars or celestial objects are scattered over the entire sky.

Experimental Prototype

The operation of the OAS system was demonstrated by building a simple OAS system using a compact IR camera and IR bandpass filters. The performance and star image contrast ratios was measured at a variety of center wavelengths.

The technical innovation in the novel Optical Azimuth Sensor (OAS) includes that it uses a compact, low power, novel optical system to accurately measure azimuth by identifying the positions of key reference stars (or other celestial bodies such as planets, the moon, or sun) in bright daylight, hazy, as well as nighttime conditions. The essence of this novel OAS azimuth sensor is a miniature wide field spectrally optimized imager that images the sky onto a high-performance focal plane array. A polar star (such as the North Star in the northern hemisphere), other key bright reference stars or other bodies can be used to accurately determine True North. Utilizing techniques developed in this program, full functionality of this optical azimuth sensor (OAS) system is also expected during bright sunlight conditions through one or more of a variety of modes, as described below.

Detecting celestial objects in daylight to extend celestial navigation to daylight hours is accomplished using the OAS. As described above, a major component of background light hiding stars during daylight is due to Rayleigh scattering that is very strongly weighted spectrally toward short wavelengths (by the fourth power of inverse wavelength!). By imaging stars at longer wavelengths (filtering out the shorter wavelength highly scattered light) the weak starlight is seen against a much darker scatter background, as shown in FIG. 1.

Figure 3:
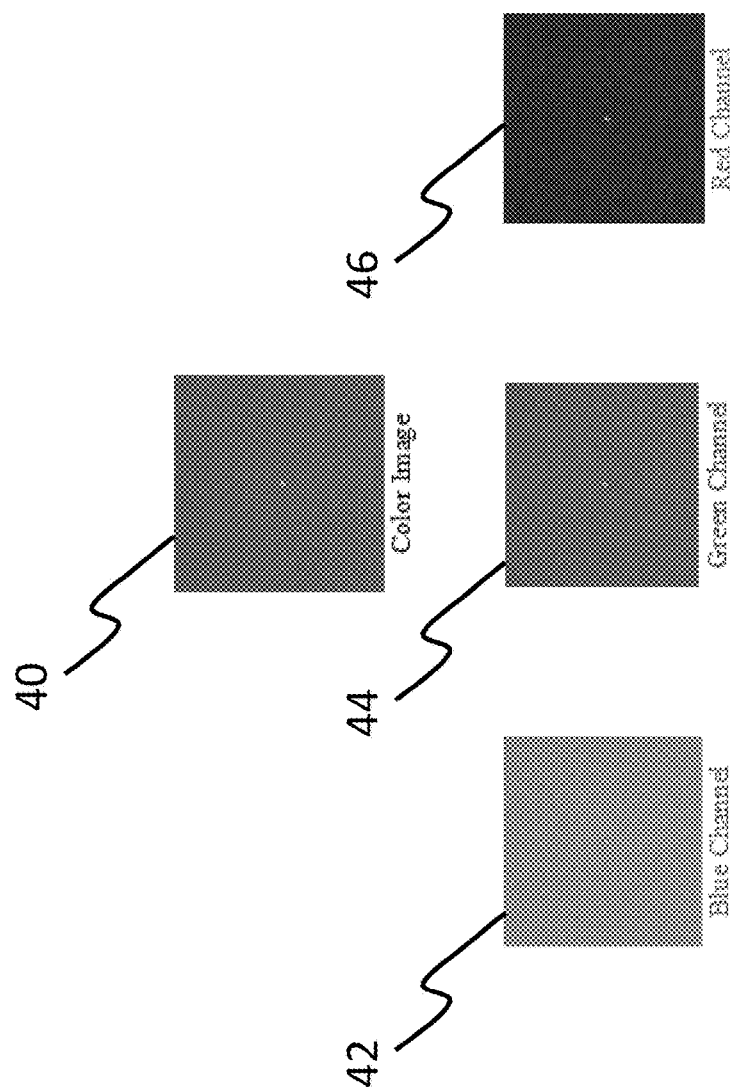
FIG. 3 shows representation of a color image.

The principle of operation of the OAS is illustrated in FIG. 3. The top image 40 in FIG. 3 represents a color image of a star at dawn. Image 42 is the blue component of color image 40. Image 44 is the green component of color image 40. Image 46 is the red (longer wavelength) component of color image 40. Thus the color image is broken into its blue, green, and red channels in the three component images (bottom). The background scattered light is greatly reduced as the wavelength increases, as evidenced by the background becoming much darker. Wavelength bands in the red and longer (infrared) spectral regions are being targeted for daylight tracking of celestial bodies. Further enhancement can be obtained by subtracting the uniform background.

FIG. 3 clearly shows that the sky appears much darker through a green filter than through a blue filter, and darker still through a red filter than through a green filter. The detectability of the star is greatly improved at longer wavelengths. Spectral bands for OAS operation in the red visible spectrum, as well as the near IR, Short Wave IR, Mid-Wave IR, Long Wave IR, and Very Long Wave IR are being considered (in the context of detector performance in those bands) for reduced scatter and enhanced detectability of the stars. However, as discussed below, Rayleigh scattering is not the only mechanism providing background signal through which the stars must be detected.

Figure 4:
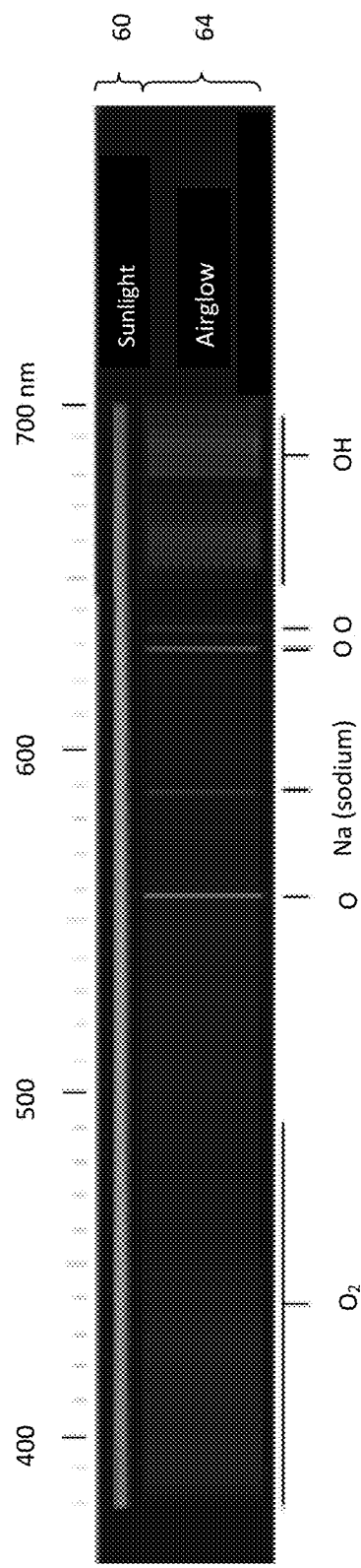
FIG. 4 shows an Airglow Spectrum.

When background scatter is sufficiently reduced, another background component called airglow can be significant, as shown in FIG. 4 where solar spectrum 60 is compared to airglow spectrum 64. Airglow is a background electromagnetic radiation that is emitted in the upper atmosphere. One source of airglow is luminescence caused when cosmic rays impinge on the upper atmosphere. The sun also creates ions through photoionization which recombine over time and contribute to airglow. Another contribution to airglow is hydroxyl ions reacting with oxygen and nitrogen in the upper atmosphere. Many other mechanisms contribute to airglow during daytime and nighttime conditions. It is apparent in FIG. 4 that spectral gaps or "windows" exist where there is little airglow flux (e.g., 675-680 nm.). Positioning daytime starlight observations in spectral windows devoid of airglow will further enhance the signal-to-noise of the star images particularly during the day. In optimizing the OAS operation, edgepass and bandpass filters can be used to take advantage of both long wavelengths for low scatter background and airglow spectral windows for low emission background.

Airglow spectral features continue into the infrared. By imaging light from targeted celestial bodies at wavelengths in airglow windows (with weak or no emission) the signal-to-noise in celestial body detection can be further enhanced. [Figure reproduced with permission from L. Cowley www.atoptics.co.uk].

Selecting optimum stars for Optical Azimuth Sensor use offers further OAS system benefits. One of these is Sirius, visually the brightest star with an apparent magnitude of −1.47. (An increase of 1 in apparent magnitude corresponds to roughly a decrease in intensity of a factor of 2.5.) In another example, the North Star, Polaris (apparent magnitude 2.01), is useful in the northern hemisphere since it is nearly fixed in position throughout the day and night. Polaris effectively rotates daily in a small circle only 0.7° from the pole axis, and so defines the True North azimuth accurately twice a day—and is readily corrected using look-up tables stored in the OAS. Other objects are also advantageous in varying OAS scenarios. For example the Red (Super) Giant star Betelgeuse (Magnitude 0.58) has many desirable characteristics. First, its emission surface is cooler than most other stars, and so it emits preferentially in the longer wavelengths (advantageous for OAS application). At the same time, although it is not as luminous as many other stars at its emission surface, it is a supergiant star so there is a huge area radiating into its unresolved image—producing in effect a large apparent brightness as seen from Earth. This combination of high luminosity and long wavelength (red) peak emission can be very useful as an OAS reference. Further its direction is nearly perpendicular to the Earth's axis so its image translates on a focal plane at a relatively high rate as the Earth rotates. This translation across focal plane pixels can also be useful in discriminating the star from background noise. This scenario would lend itself to a SIMD processor which can efficiently process such images from nearest neighbor operations.

Other Celestial Objects. In addition or combination with images of stars, images of planets, the moon, or the sun also form the basis of robust OAS configurations. For example, imaging the planets are similar to the stars, but they can be brighter and in some cases are resolved (have more than one resolution cell across their image). For example, the apparent magnitudes of these objects are the Moon (−12.9), Venus (−4.6), Jupiter (−2.9), Mars (−2.9), Mercury (−1.9), and Saturn (−0.2). The moon and the sun also offer some interesting OAS configurations. The Sun can be imaged at long IR wavelengths including the bands described earlier through the Very Long Wave IR (VLWIR), some of which pass readily through clouds as the wavelengths approach and become larger than the water droplets. Such an OAS system could is very useful for overcast situations where some other OAS configurations may be less or not effective. As with the stars, accurate location of the sun's image as it tracks can be accurately correlated with direction, and high accuracy can be obtained with internally stored reference data and an accurate clock/calendar.

Still other OAS embodiments use other filtering approaches, such as narrow spectral filters in the Frauenhofer spectrum where the daylight is actually dark in narrow absorption bands in daylight. In this embodiment, the dark absorption lines (e.g., the Frauenhofer Spectrum) superposed on the solar continuum are excellent places to detect reference stars—which may be frequency shifted (into the dark lines) due to their motion in space. These features are typically very narrow, however, and narrow spectral filters can enable such embodiments of the OAS.

Figure 5:
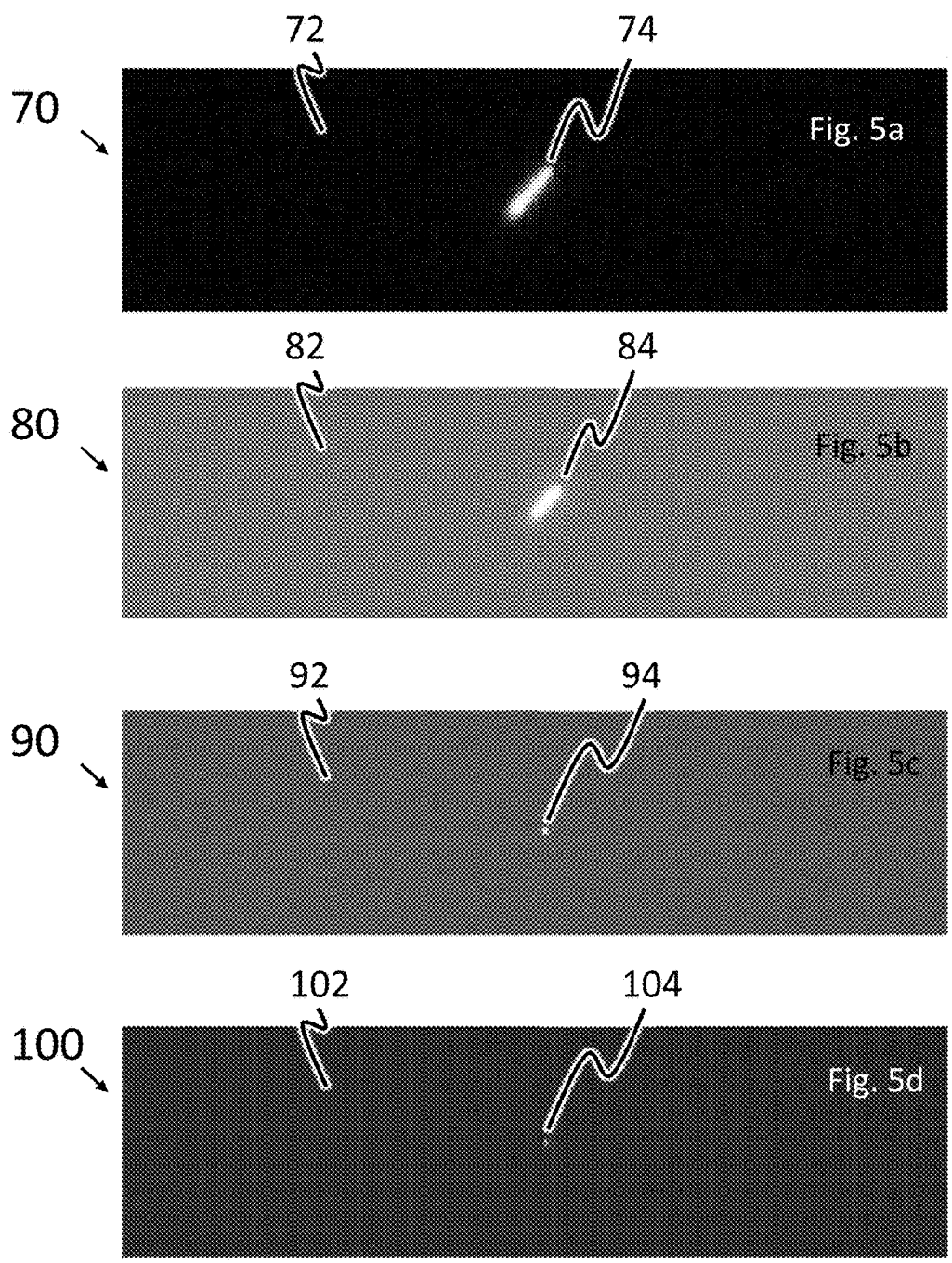
FIG. 5a shows a Photograph of Venus (0.85-1.0 micron IR) Before Dawn.
FIG. 5b shows a Photograph of Venus (0.85-1.0 micron IR) During Dawn.
FIG. 5c shows a Photograph of Venus (0.85-1.0 micron IR) Near Sunrise.
FIG. 5d shows a Photograph of Venus (0.85-1.0 micron IR) Well After Sunrise.

Reference is now made to FIG. 5. Images 70, 80, 90, and 100 in FIG. 5 are photographs of Venus (apparent magnitude of −4.36) taken in the spectral band from 0.85-1.0 microns under the 4 sky conditions 1) before dawn, 2) during dawn, 3) near sunrise, and 4) well after sunrise, respectively. These four images contain background components 72, 82, 92, and 102 respectively; and Venus images 74, 84, 94, and 104 respectively. The sky was dark enough in images 70 and 80 to support longer exposures, and the image was heavily exposed and translation of Venus is visible during the exposures. As the sky brightened near sunrise, the exposures were shorter and the background from the sky was more intense. However, even well after sunrise image 100 the image of Venus is clearly visible and readily detected even without processing and background subtraction. When image 100 was taken, Venus could not be visually found in the sky.

It is advantageous for the OAS devices to be able to function in the midst of haze and smoke, and ideally even in the presence of partial or full cloud cover. As the wavelength of the light imaged grows larger than the scatterers, the ability to image through the scatterers improves. While cloud particle size distributions seem to vary widely with cloud type, one measurement on Stratus clouds indicated that the water fraction and droplet size vary and fall off toward the cloud top and bottom, with a peak in the 5-6 micron effective radius. Embodiments of the OAS operating at long IR wavelengths, up to and through the VLWIR described earlier, may be additionally useful for OAS operation through clouds. In one such OAS embodiment the sun is a key element. The sun emits light roughly according to a blackbody curve, and although its emission falls off at longer IR wavelengths and the atmosphere and clouds absorb a fraction of the light, enough light may be transmitted through the clouds at long wavelengths to clearly image the solar disk. For example, there is a transmission band in the atmosphere from 16 to 24 microns, and at 17.8 microns more than 40 percent of light is transmitted through a 1 km horizontal air path at sea level and 46% relative humidity at 15 C. As the imaged disk of the sun translates across several pixels in an uncooled focal plane array such as a microbolometer array, the location and direction of the sun can be determined and utilized to define azimuth.

In addition to azimuth sensing, WRI is investigating the accuracy attainable in novel optical self-locating techniques related to the OAS device. For example, relative positions of near and far objects such as satellites, the moon, planets, and the sun and other stars can be utilized together with an accurate clock in software to extract location.

In other embodiments based on man-made celestial objects of the present teachings for OAS azimuth sensing, self location, and additional functions is described here. These embodiments include a modest constellation of miniature reflecting satellites (such as reflecting spheres or more complex structures—but passive and insensitive to solar flares and attack) that are placed in near earth, far, or geosynchronous orbits to provide optical reference signals. These orbiting optical references could be spherical or curved reflective sections that are oriented to illuminate the earth below, and could readily exceed the intensities of bright stars. In a more elaborate limit, small passive retro-reflecting corner-cube reflector satellites can be put in orbit and interrogated optically in embodiments of an optical GPS alternative that is not jammable. Even relatively simple nanosecond-scale pulses from an advanced OAS and timing circuits can give accuracies on the order of feet. Active reference satellites containing optical emitters, including infrared, midwave and longwave infrared, and even VLWIR emitters can be used. These emitters include, without limitation, lasers, LEDs, SLEDs, resonators, etc.

Figure 6:
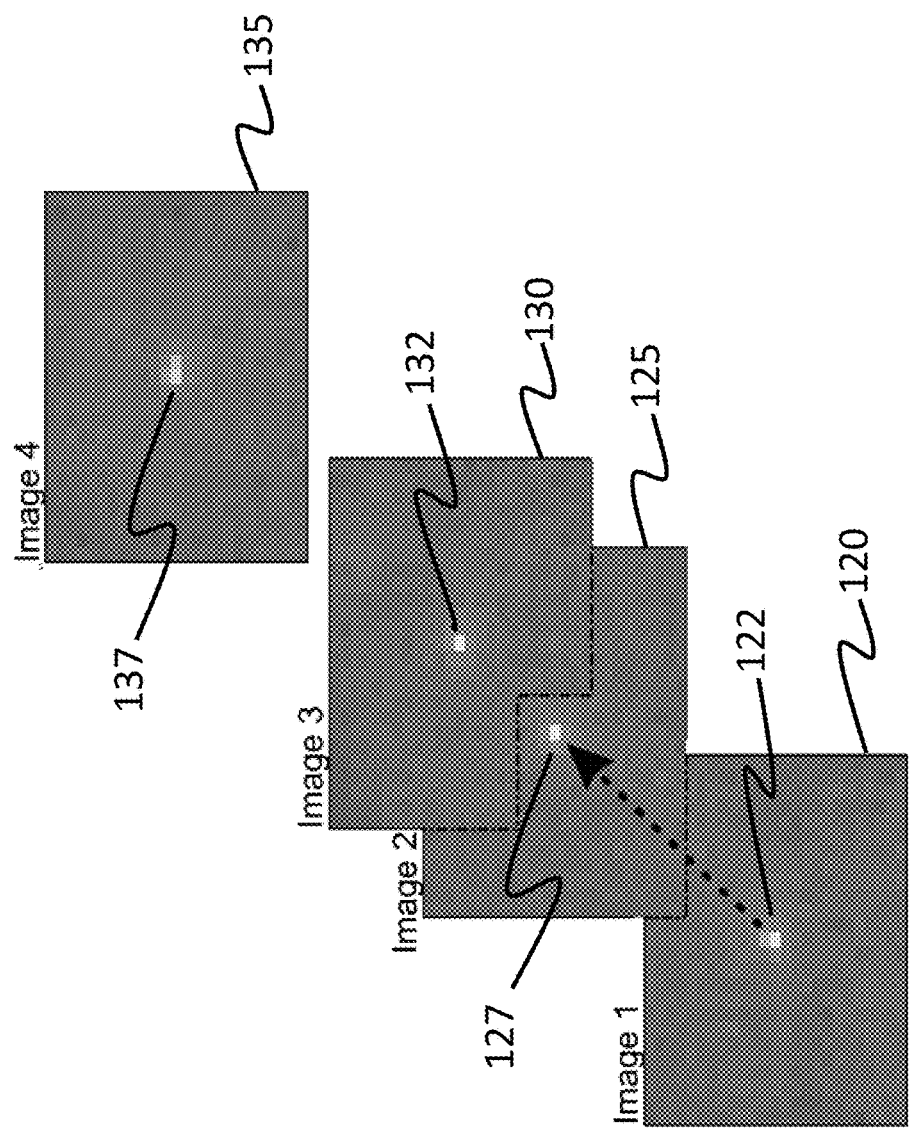
FIG. 6 shows Sequential Daylight Images of Venus in 1.3-1.7 micron IR Band.

Reference is now made to FIG. 6 which includes four time sequential images 120, 125, 130, and 135 of Venus taken in broad daylight through a filter passing the 1.3 to 1.7µ spectral IR band, and imager, and an InGaAs Focal Plane Array. This sequence of images 122, 127, 132, and 137, are co-registered as Venus moved across the sky.

Figure 7:
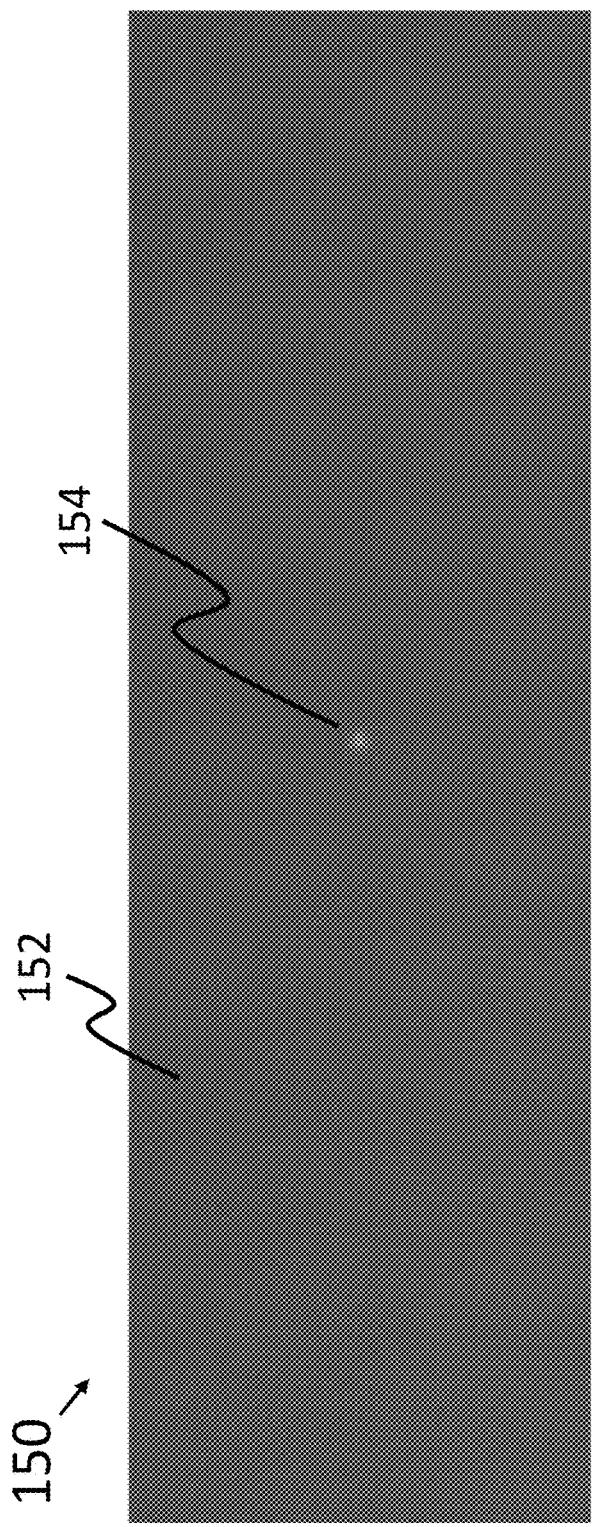
FIG. 7 shows a Daylight Image of Venus in 0.9-1.0 micron IR Band.

Reference is now made to FIG. 7. Using another OAS embodiment, Venus was photographed in daylight using a filter transmitting the 0.9-1.0 micron IR spectral band using a silicon focal plane array. The resulting image of Venus 150 contains background component 152 and Venus image 154.

Figure 8:
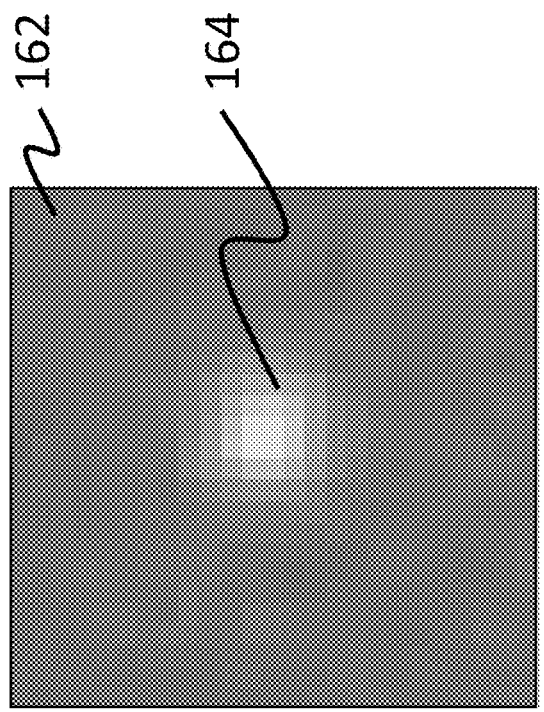
FIG. 8 shows a Detail of Daylight Image of Venus in 0.9-1.0 Micron IR Band.

A detail of this image is shown in image 160 of FIG. 8 and contains background 162 and Venus image 164. This photo was taken a bit more than half an hour after sunrise. In the corresponding color image taken in the visible band at nearly the same time, the image of Venus was not visible.

Figure 9:
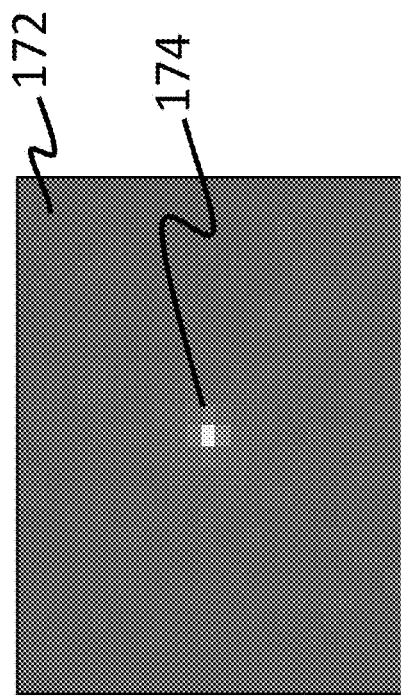
FIG. 9 shows a Near IR Daylight Image of Betelgeuse.

Reference is made to FIG. 9 which contains image 170 of the star Betelgeuse photographed during full daylight using the longer wavelength half of the Near Infra-Red (NIR) spectral band. Image 170 contains background 172 and Betelgeuse image 174, and is the sum of 256 images taken in rapid succession, which lowers the background noise.

Figure 10:
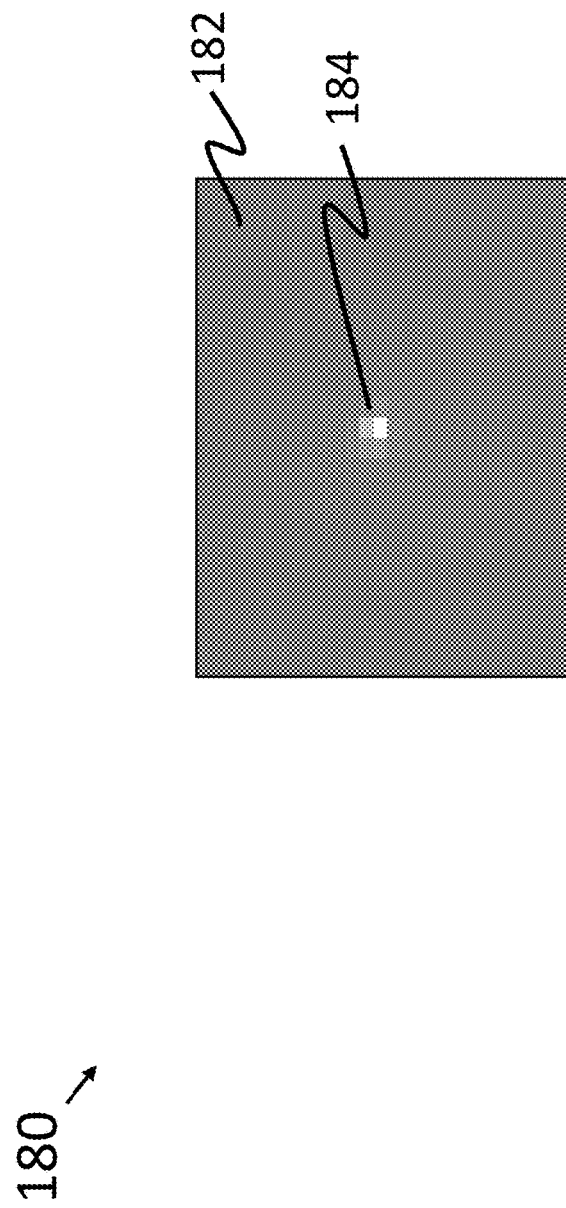
FIGS. 10-13 show daylight images of various stars obtained using the system of these teachings.

Reference is now made to FIG. 10 which includes the sum of 256 broad daylight images taken in rapid succession 180 of Betelgeuse taken in the narrower spectral band of roughly 50 nm surrounding one micron. The location of the center of the star image can be interpolated with a precision of less than a pixel, giving rise to expected azimuth accuracies of less than 1 mil for common silicon FPAs containing several megapixels.

Figure 11:
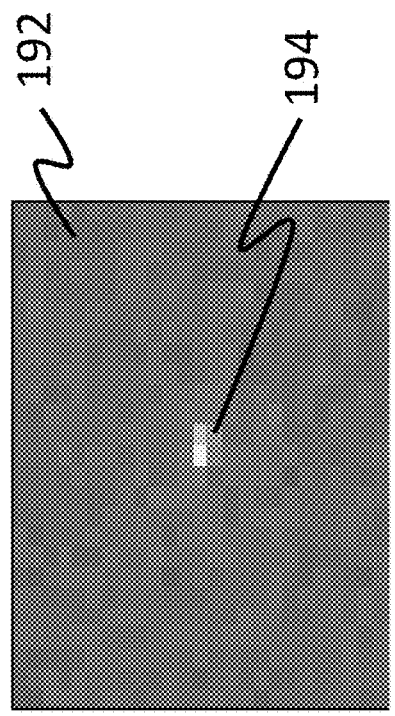

Reference is made to FIG. 11 which includes the sum of 256 broad daylight images taken in rapid succession 190 of Aldebaran in the same narrow spectral band around one micron. Cooler stars such as Betelgeuse are relatively brighter in the NIR than those spectrally weighted toward shorter wavelengths.

Figure 12:
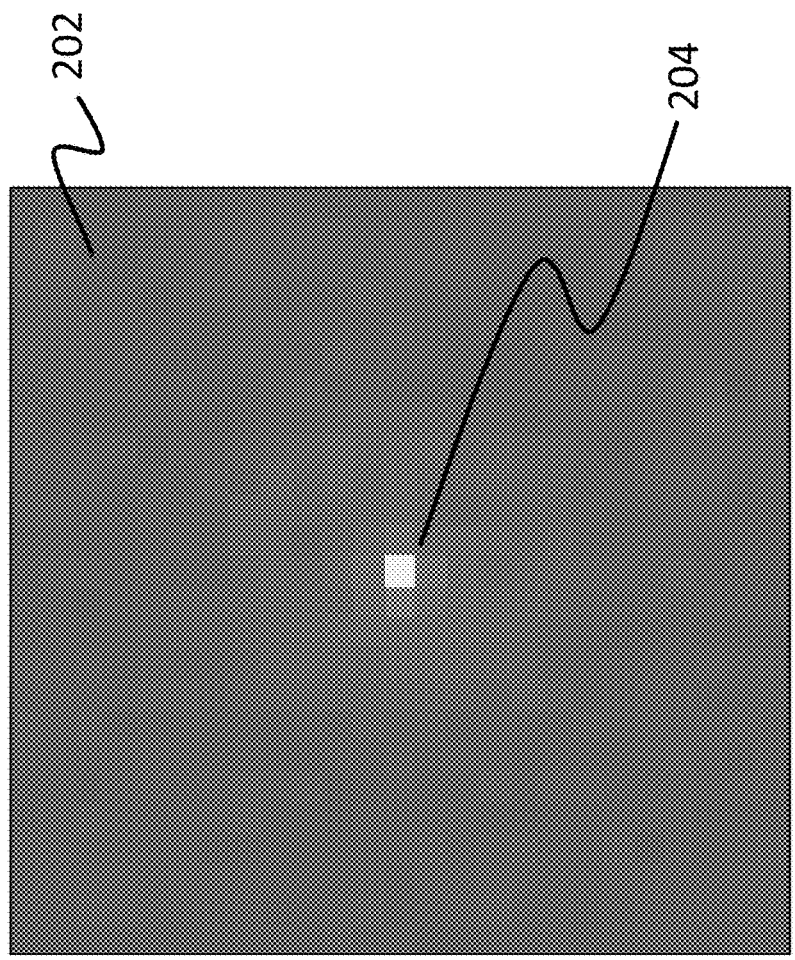
Figure 13:
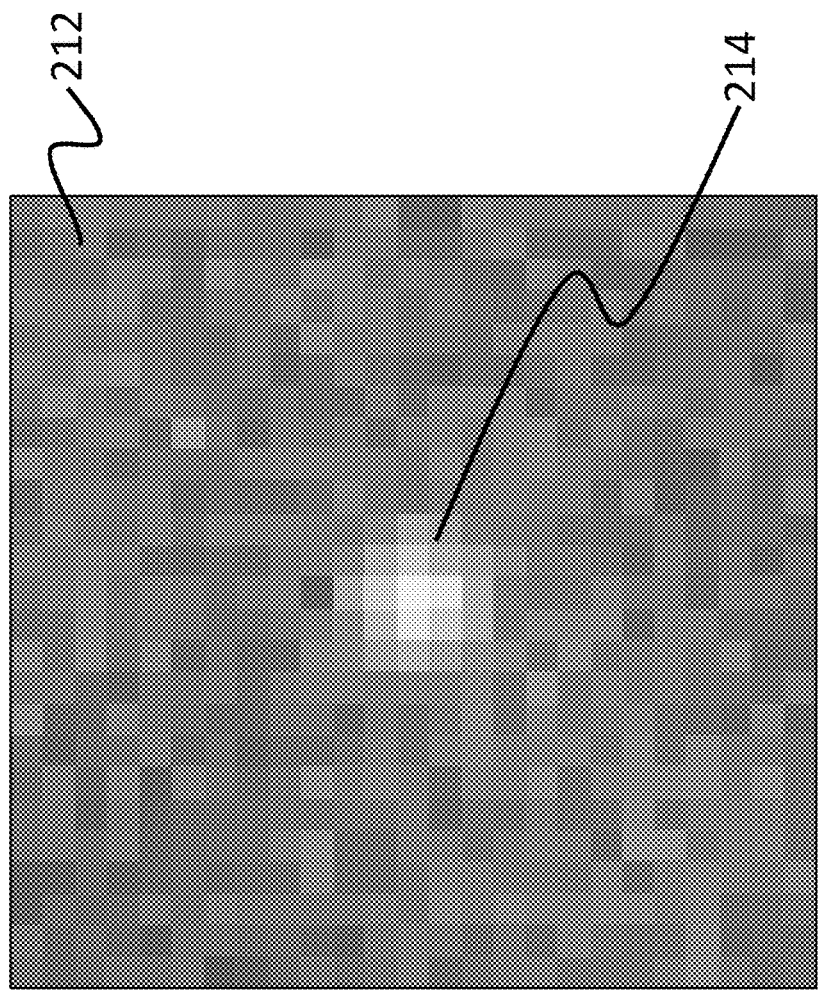

Reference is now made to FIG. 12 which contains image 200 of the star Betelgeuse taken in broad daylight with an imager of entrance pupil diameter equal to 20 mm. The star image 204 is on background 202. This is compared to image 210 of which contains image 214 of Betelgeuse on background 212 but this time using the same imager but with entrance pupil diameter of 2.5 mm.

When this same star is imaged through a much smaller lens aperture, the SNR naturally decreases, but it does so gracefully.

Reference is made to FIG. 14 where the SNR is shown for a number of decreasing aperture sizes. The signal-to-noise ratio decreases as the entrance pupil diameter of the imager decreases, but in a graceful fashion. This data shows that OAS operation can be extended to broad daylight using optimized imagers that are very small.

Figure 15:
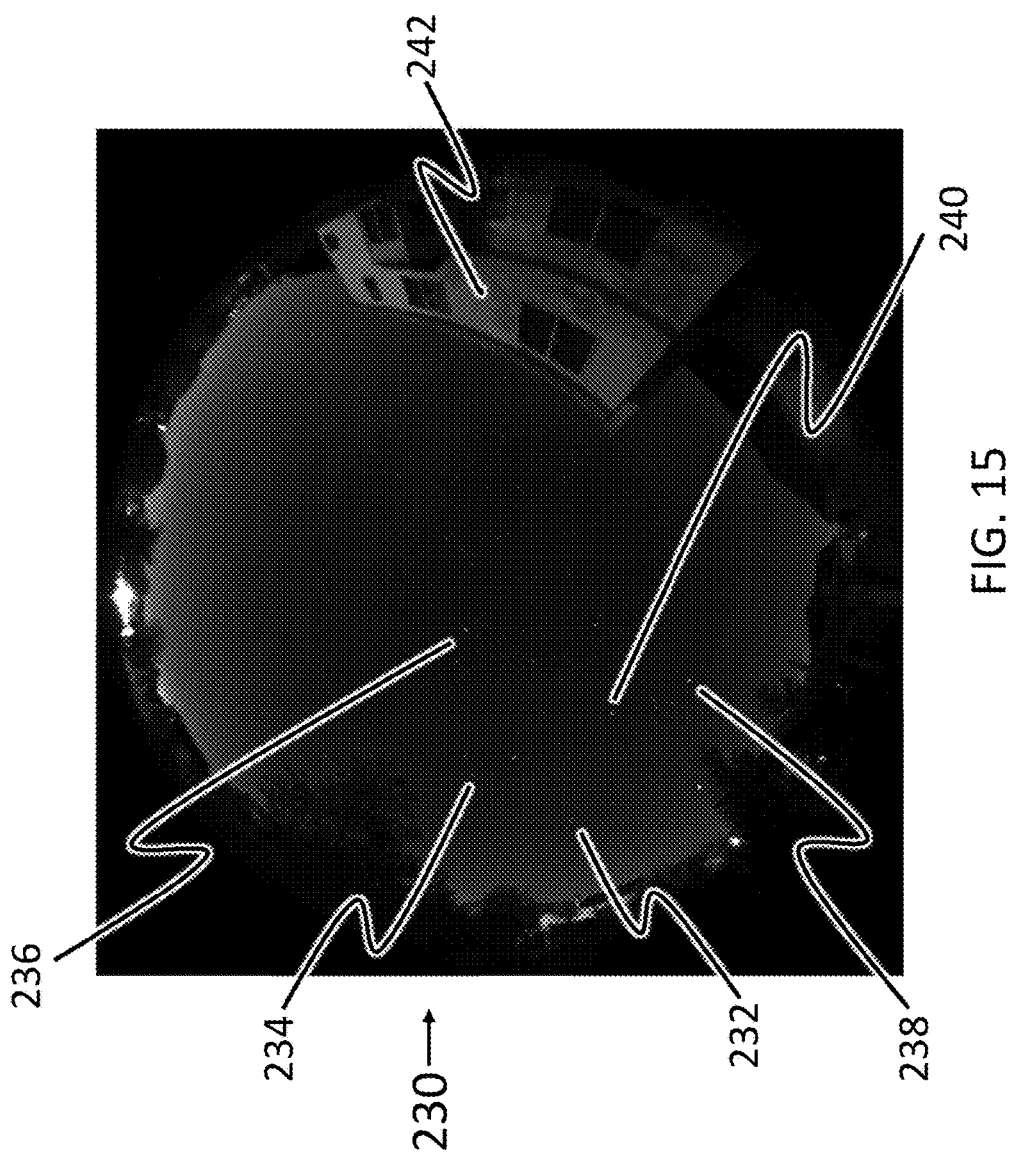
FIG. 15 shows an Image from a wide angle imager obtained using the system of these teachings.

Various embodiments of OAS sensors use imagers with different fields of view. Narrow fields of view may allow for detection of dimmer stars while larger fields of view have a greater chance of including brighter stars in the field. Balancing these trade-offs results in an optimized widefield imager, typically ranging from 15° to 120° field of view. In some embodiments of the OAS extremely wide field of view imagers may be used. Image 230 FIG. 15 shows the night sky through a fisheye imager with field of view larger than 180°. This image shows celestial images 232, 234, 236, 238, and 240, as well as non-celestial objects such as house 242.

There is a large body of art and science to celestial navigation, and in general these techniques can be implemented with great precision and in daylight using the OAS sensor. The OAS can establish the location of the celestial sphere with high precision and in full daylight and can be used for self location.

Figure 16:
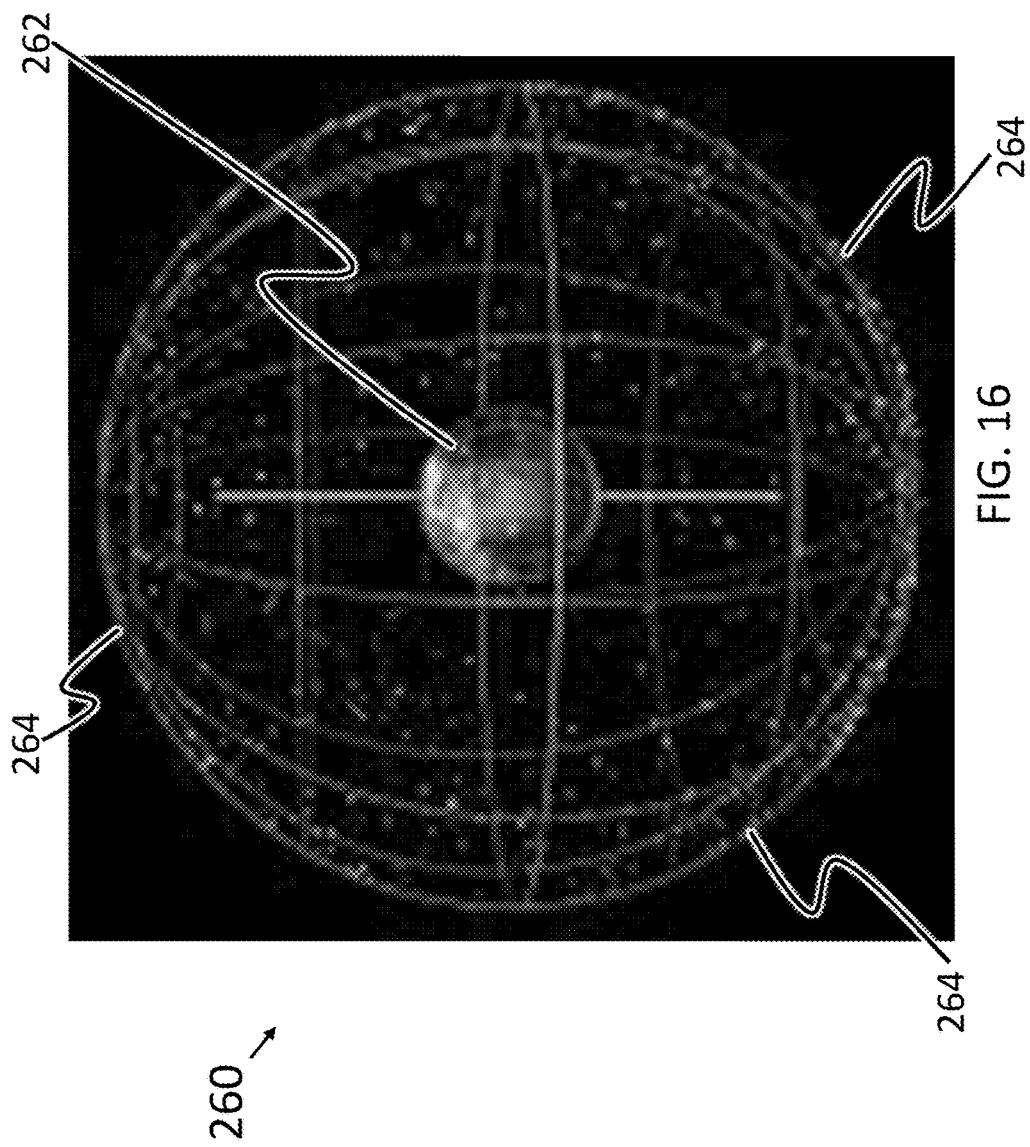
FIG. 16 illustrates the earth (center) surrounded by a Celestial Sphere as used in the system of these teachings.

Reference is now made to FIG. 16 with illustration 260 that contains the earth 262 (center) surrounded by a Celestial Sphere 264. The celestial sphere is a conceptual surface on which the fixed stars are projected. As the Earth rotates, the celestial sphere exhibits an apparent rotation with respect to an observer on Earth. The OAS system accurately locates the celestial sphere orientation even during daylight, thus providing a highly accurate azimuth, elevation, and self location sensing capability. In another embodiment of the OAS, the OAS sensor includes a highly accurate electronic normal (vertical) vector sensor (such as an accelerometer) that is used to extract the local earth coordinates from the sensed celestial sphere. Figure from Reference [2].

In other embodiments of the present teachings for OAS sensors, self location, and other functions are also provided. As discussed earlier some embodiments include a modest constellation of miniature reflecting satellites (such as reflecting spheres or more complex structures—but passive and insensitive to solar flares and attack and jamming) that are placed in near earth, far, or geosynchronous orbits to provide optical reference signals. This is illustrated by bright points on the celestial sphere shown on celestial sphere 264. These orbiting optical references could be spherical or curved reflective sections that are oriented to illuminate the earth below, and could readily exceed the intensities of bright stars. In a more elaborate limit, small passive retro-reflecting corner-cube reflector satellites can be put in orbit and interrogated optically in embodiments of an optical GPS alternative that is not jammable. Even relatively simple nanosecond-scale pulses from an advanced OAS and timing circuits can give rise to accuracies on the order of feet. Other embodiments of such artificial reference satellites include active optical emitters which emit light toward the earth from their specific reference location in orbit. Any optical wavelength can be used for such emitters which can include without limitation lasers, LEDs, SLEDs, etc. For the case of narrowband emitters narrowband filters can be used in OAS sensor embodiments to greatly reduce background light and enhance artificial reference celestial object detectability and OAS operation.

In other embodiments of the present teachings, to an observer on Earth, the celestial sphere rotates during day and night with a period of 24 hours. The OAS embodiments equipped with an accurate clock can accurately determine information such as position from the accurately located celestial sphere orientation that the OAS sensor can determine even during daylight, thus providing a highly accurate azimuth sensing capability. The position of the celestial sphere is accurately calculable for a given time and location on Earth.

Alternatively, if the OAS sensor is used to determine the position of the celestial sphere, and a normal vector pointing from the center of the earth through the observers location (such as from a vertical sensor like an accelerometer) is accurately known, then the observers location on Earth is calculable.

In another embodiment of the OAS sensor described above, the sun is imaged at any wavelength and can be used to determine celestial sphere orientation, azimuth, elevation, etc. In such embodiments that operate at increasing wavelengths, the sun's image can be sharply obtained through denser and heavier cloud cover. If the wavelengths used are much larger than the diameter of the cloud particles, they will not be scattered as visible light is and the sun should is clearly imageable through the clouds. A compact, inexpensive microbolometer focal plane array can be used for extracting the sun's positional data.

Figure 17:
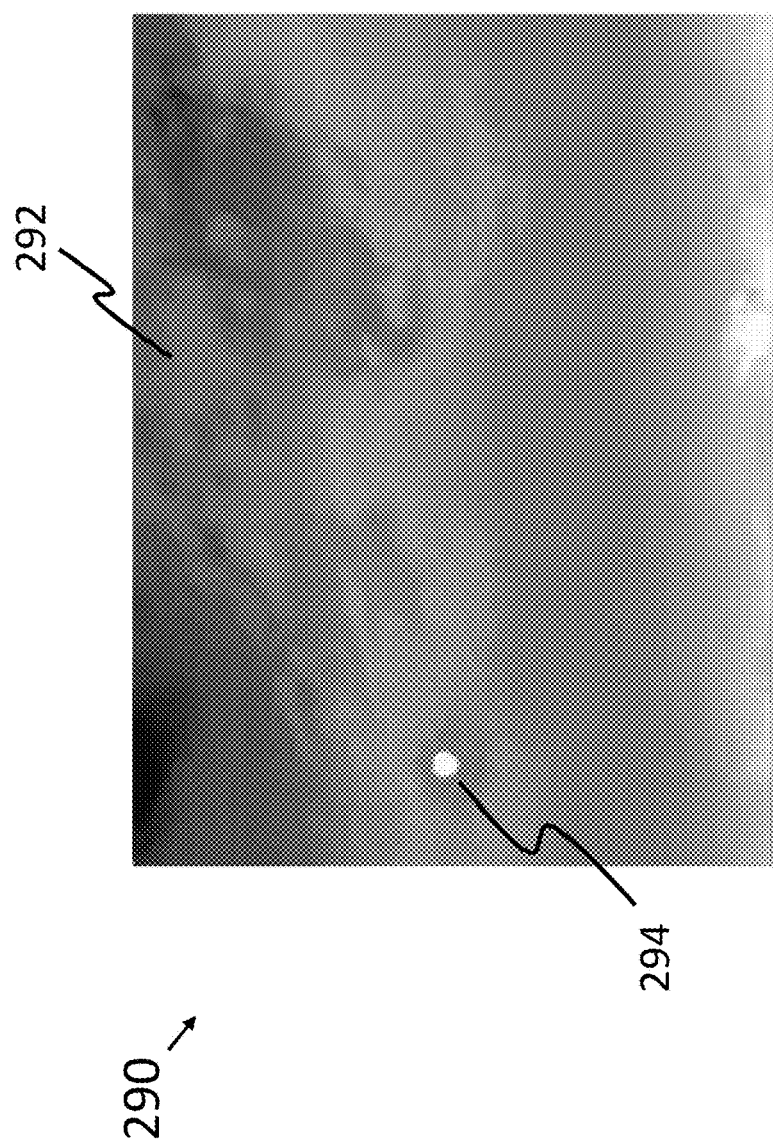
FIG. 17 shows an LWIR Image of Sun in Light Clouds obtained using the system of these teachings.

References made to FIG. 17 which contains longwave infrared image 290 taken with a microbolometer array showing a clouded sky to 92 and the image of the sun's disk 294 visible through the light clouds. The sun imaged in 290 in the Long Wave Infra-Red (LWIR) band using wavelengths from 7-14 microns. In various embodiments of the OAS the position of the sun's disk can be used together with an accurate clock to identify the orientation of the celestial sphere. In an alternative embodiment of thru-cloud OAS operation, the sun is imaged at long wavelengths onto the focal plane. Over a short period of time, the disk edge of the sun sweeps across the focal plane and accurately defines the trajectory of the sun. This trajectory is used to determine azimuth.

Figure 18:
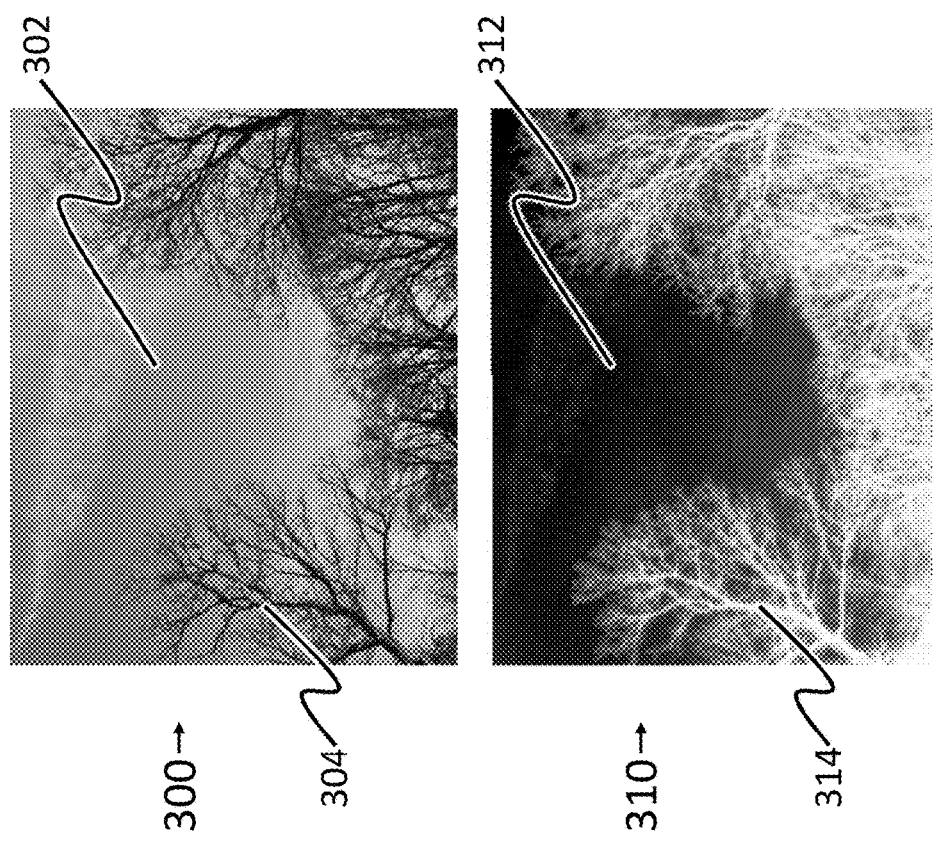
FIG. 18 shows Visible (TOP) and LWIR (BOTTOM) photographs of the Sky, the LWIR image obtained using the system of these teachings.

Reference is now made to FIG. 18. FIG. 18 contains visible band image 300 of the sky and longwave infrared band image 310 of the same region of the sky. The visible image shows a bright sky 302 against dark trees 304 while the longwave image 310 shows a dark sky 312 against bright trees 314. The sky is generally dark in the IR, although the cloud shown is still visible. Different clouds exhibit vastly differing water droplet sizes. For clouds with micron sized water droplets, this band may be effective for viewing the sun through them. There are longer wavelength spectral windows transmitted by the atmosphere, and they can be used for OAS operation with larger droplet sized clouds.

Figure 19:
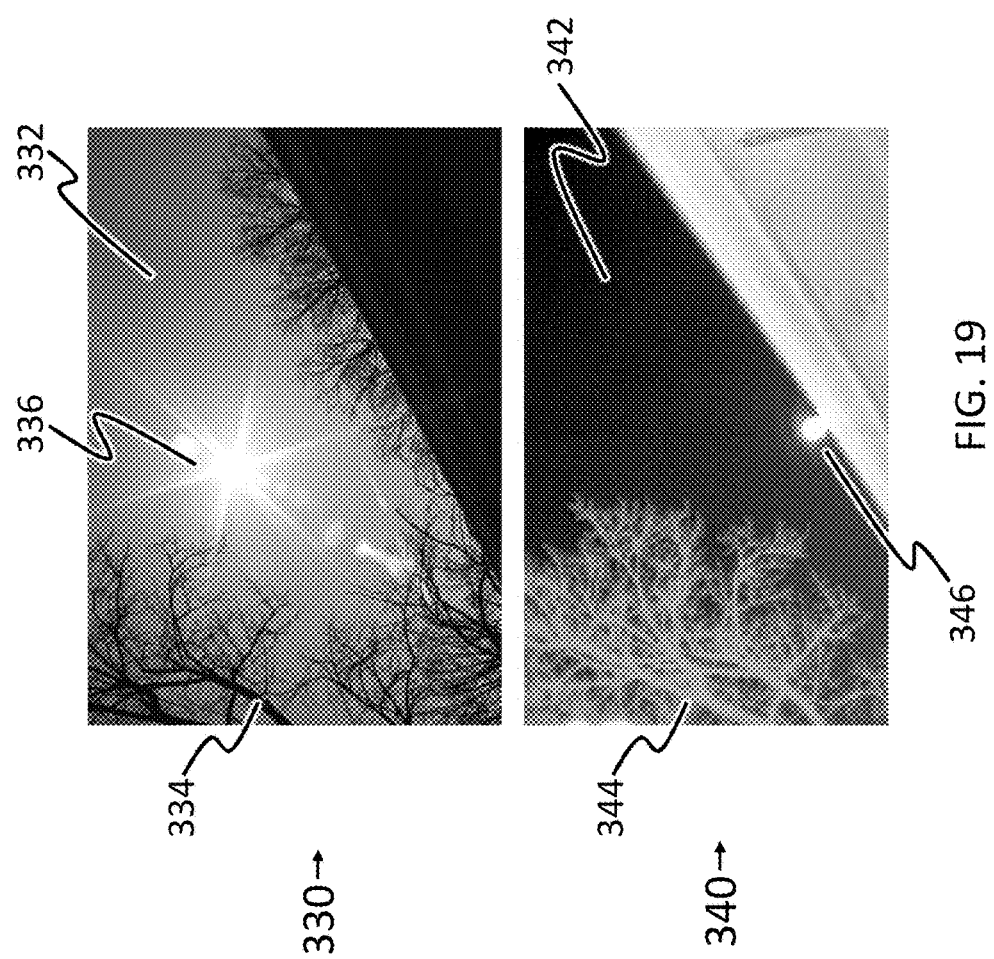
FIG. 19 shows Visible (Top) and LWIR (Bottom) Photographs of the Sun, the LWIR image obtained using the system of these teachings.

Reference is now made to FIG. 19. FIG. 19 contains visible image 330 of the sky 332 with the sun 336 and trees 334. FIG. 9 also contains longwave infrared image 340 of sky 342 and some 346 entries 344. The sky is visibly darker in the longwave band in the disk of the sun is clearly visible.

Figure 20:
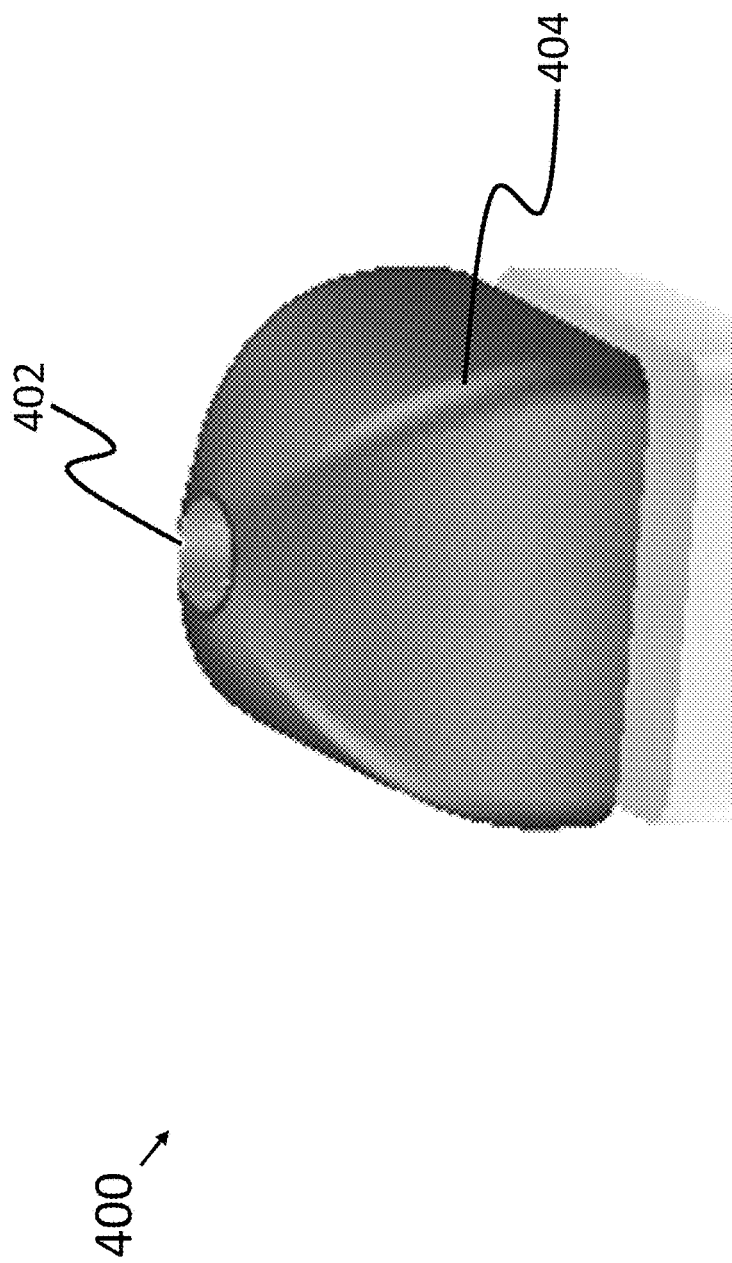
FIG. 20 shows one view of an embodiment of the system of these teachings.

Reference is made to FIG. 20 which illustrates OAS module 400 including housing 404 and imager aperture 402. The OAS module 400 contains the specially optimized imager, focal plane array and electronic processor is described earlier. In this embodiment the OAS module is targeted to occupy roughly a 1" to 2" cube.

Figure 21:
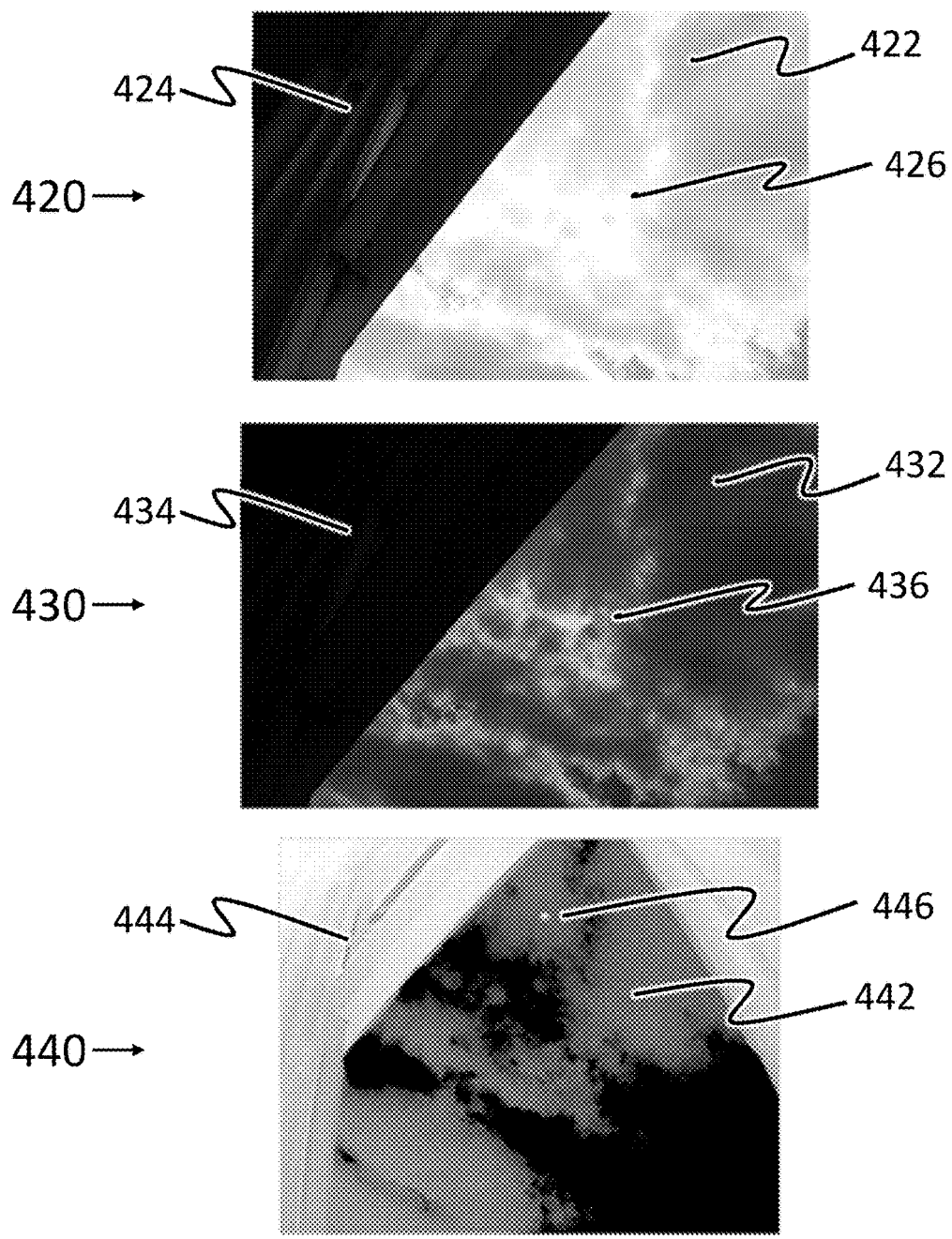
FIG. 21 shows visible (top two) and LWIR (Bottom) Photographs, the LWIR image obtained using the system of these teachings.

Reference is made to FIG. 21 which shows an embodiment of the OAS that images the sun's disk through clouds. FIG. 21 includes visible image 420 including cloudy sky 422 and bright region 426 obscuring the sun's disk. Visible band Image 430 is a shorter exposure version of image 420 and shows cloudy sky 432 and bright cloudy region 436 obscuring the sun's disk. The darker exposure of image 430 reveals that no image of the sun's disk is visible through the clouds in the visible spectral band. Longwave infrared spectral band image 440 taken with a microbolometer focal plane array shows cloudy sky 442 and clear image of the sun's disk 446. This shows operation of OAS embodiments based on imaging the sun's disk that are operable through moderate cloud cover. OAS operation through heavier cloud cover can be obtained by operating the OAS and even longer spectral wavelength bands such as in the V LWIR described earlier. In the images of FIG. 21 regions 424, 434, and 444 are regions of the images inside the room next to the window through which the sky was photographed.

Figure 22:
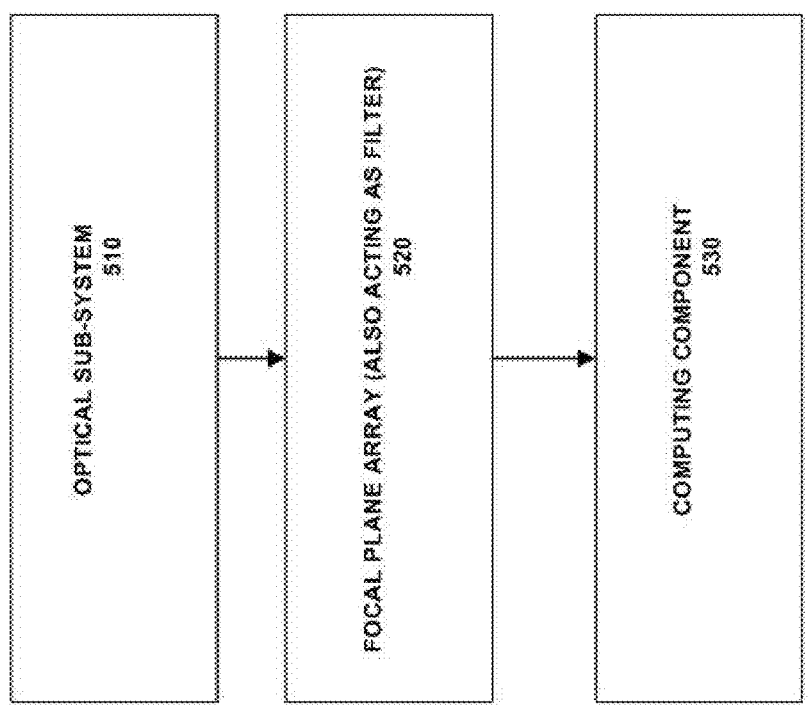
FIG. 22 shows a block diagram representation of one embodiment of the system of these teachings.

Reference is now made to FIG. 22 which shows schematically an embodiment of the OAS of the present teachings. Here optical subsystem 510 contains a spectrally optimized imager as described above. Also as described above, bandpass filters and edge pass filters can be used to achieve the desired spectral optimization. The imager 510 is used to image the sky onto focal plane array 520. Due to the inherent spectral sensitivity of the focal plane array 520, it also further acts as a spectral filter. Computing or processing element 530 receives the image from the focal plane and produces angular and navigational information such as azimuth from the image positions of celestial objects.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present invention, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although embodiments of the present teachings have been described in detail, it is to be understood that such embodiments are described for exemplary and illustrative purposes only. Various changes and/or modifications may be made by those skilled in the relevant art without departing from the spirit and scope of the present disclosure as defined in the appended claims.

What is claimed is:

1. An optical system for determining navigational information, the system comprising:
   at least one satellite in Earth orbit; said at least one satellite providing at least one optical signal;
   a module, said module comprising an optical imager and a focal plane array detector;
   said focal plane array detector having sensitivity to said at least one optical signal;
   said optical imager configured to image a portion of the sky onto said focal plane array detector; and
   a computing component configured to receive the image from the focal plane array detector and to produce navigational information therefrom.

2. The optical system of claim 1 further comprising a vertical vector sensor.

3. The optical system of claim 2 wherein the computing component also receives output from the vertical vector sensor.

4. The optical system of claim 3 further comprising a clock, and wherein the computing component also receives output from the clock.

5. The optical system of claim 2 wherein the navigational information includes location.

6. The optical system of claim 1 further comprising a clock, and wherein the computing component also receives output from the clock.

7. An optical system for determining navigational information, the system comprising:
   a spectral filter component configured to limit light to within a predetermined range of a spectrum; the predetermined range selected such that a signal is enhanced with respect to a background;
   a focal plane array, having sensitivity in the predetermined range;
   an optical subsystem optically configured to image a portion of the sky onto the focal plane array; and
   a computing component configured to receive the image from the focal plane array and to produce navigational information therefrom.

8. The optical system of claim 7 further comprising a vertical vector sensor.

9. The optical system of claim 8 wherein the computing component also receives output from the vertical vector sensor.

10. The optical system of claim 9 wherein the navigational information includes location.

11. The optical system of claim 9 further comprising a clock, and wherein the computing component also receives output from the clock.

12. The optical system of claim 7 further comprising a clock, and wherein the computing component also receives output from the clock.

* * * * *